Patented Feb. 17, 1948

2,435,974

UNITED STATES PATENT OFFICE 2,435,974

P-AMINOBENZENE SULFONAMIDES

Henry Martin, Hans Gysin and Otto Neracher, Basel, and Rudolf Hirt, Riehen, Switzerland, assignors to J. R. Geigy A. G., Basel, Switzerland, a Swiss firm No Drawing. Application May 1, 1944, Serial No. 533,658. In Switzerland May 6, 1943

3 Claims. (Cl. 260—397.7)

A process for the manufacture of p-amino benzene sulfone acylamides has been described according to which sulfonamides of the benzene series or their salts containing in p-position a nitrogen-containing group are interacted with substituted carboxylic acids of the benzene series or with their functional derivatives being substituted by alkyl and/or alkoxy or alkylthio groups, preferably in the presence of catalysts or acid binding agents, and the p-positioned nitrogen group is eventually converted into an amino group. Furthermore, the above described process has been extended to highly alkylated carboxylic acids of the benzene series as well as to carboxylic acids with condensed nuclei, which carboxylic acids are involved in the acylation.

Whereas hitherto exclusively compounds with aromatic or cyclic carboxylic acids have been described, we have now found that indifferently substituted cinnamic acids are also very suitable for the same purposes. As inert substituents may be understood those which are not capable of forming salts, that is to say which do not possess a manifest polar character, such as for instance halogens, alkoxy, aryloxy, alkyl, aryl groups, etc.; these substituents may be present either in the aliphatic or aromatic portion of the cinnamic acid molecule. The new compounds differ from other acylated p-amino-benzene sulfonamides by their efficacy in checking the development of tubercle-bacilli.

As sulfonamides of the benzene series containing a nitrogen-containing group in p-position to the sulfonamide group there may be cited: p-aminobenzene sulfonamide, p-acylaminobenzene sulfonamide, p-nitrobenzene sulfonamide and the like. Instead of the nitro group any other group convertible by reduction into the amino group may be used, such as for example the nitroso, azo, azoxy or hydrazo group. Azomethine and acylamino groups may be converted into amino groups by hydrolysis. Advantageously those acyl radicals are selected which can again easily be split off. As such radicals the following may for example be enumerated: the acetyl or carbomethoxy radical which are again easily split off by a hydrolytical treatment without changing the acylated sulfonamide group.

The present invention will now be illustrated but not limited by the following examples, the parts being by weight.

EXAMPLE 1

38.9 parts of 3:4-dimethyl cinnamoyl chloride are treated with 200 parts of chlorobenzene, 2 parts of copper powder and 42.8 parts of p-acetylaminobenzene sulfonamide and the whole is boiled under reflux for 6 hours. The reaction mass is then introduced into a dilute sodium carbonate solution and filtered after cooling. The chlorobenzene is blown off by means of steam and the aqueous solution is acidified. The raw acetyl compound is reprecipitated in a sodium carbonate solution and heated under reflux for 1 hour with 20 parts of sodium hydroxide in 100 parts of water. After dilution with water the mixture is acidified, whereby the 4-aminobenzene-N-(3:4-dimethylcinnamoyl)-sulfamide is precipitated. After reprecipitation by means of a sodium carbonate solution in the presence of animal charcoal, the new compound is recrystallised from water and alcohol. Its melting point is 135° C. (under decomposition).

According to the same method the analogous compounds with the acyl radical

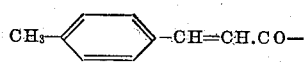

may be produced (M. P. 209°–210° C.).

Instead of the acid enumerated above the following carboxylic acids or their derivatives can be used, whereby bodies with similar properties are obtained: o- and m-methylcinnamic acid, 3:5-dimethylcinnamic acid, 3:4:5-trimethylcinnamic acid, p-ethylcinnamic acid, p-isopropylcinnamic acid, p-propylcinnamic acid, p-isobutylcinnamic acid, tertiary butylcinnamic acid and the like; o-, m- and p-chlorocinnamic acid, 2:4-dichlorocinnamic acid, 2:6-dichlorocinnamic acid, 3:4-dichlorocinnamic acid, 2:3:4-trichlorocinnamic acid 2:4:5-trichlorocinnamic acid, etc.; 4-methoxycinnamic acid, 4-ethoxy cinnamic acid, 4-isopropoxycinnamic acid, etc.; 3:4-dimethoxycinnamic acid, 2:3-dimethoxycinnamic acid, 2:4-dimethoxycinnamic acid, 2:4-diethoxycinnamic acid, 3:4-methylene dioxycinnamic acid, 4-phenoxycinnamic acid, etc.

EXAMPLE 2

48.5 parts of α-phenylcinnamoyl chloride are dissolved in 200 parts of chlorobenzene, then 2 parts of copper powder and 42.8 parts of p-acetylaminobenzene sulfonamide are added thereto and the whole is heated for 12 hours to 135°–140° C. After dissolution in a warm sodium carbonate solution the organic solvent is separated in the separating funnel. The aqueous solution is clarified and treated with an excess of hydrochloric acid, the acetyl compound being thus precipitated. Without further purification the latter is then heated under reflux for 2 hours with 20 parts of sodium hydroxide in 80 parts of water and, after dilution with water, precipitated with hydrochloric acid. When recrystallised from alcohol and water 4-aminobenzene-N-(α-phenylcinnamoyl)-sulfamide is obtained, this product having the melting point of 211°–212° C.

If, instead of α-phenylcinnamic acid, β-phenylcinnamic acid is used, a compound melting at 197°–199° C. is obtained. Instead of α-phenylcinnamic acid there may quite well be used; α-tolylcinnamic acid, d-(p-chlorophenyl)-cinnamic acid, α-(p-methoxyphenyl)-cinnamic acid, α-(3:4-dimethoxyphenyl)-cinnamic acid, etc.

Example 3

40.4 parts of p-nitrobenzene sulfamide are suspended in 200 parts of pyridine and, while stirring, 41.3 parts of β-propylcinnamoyl chloride are caused to drop thereinto. Then the mixture is heated for one hour on the water-bath, whereupon the solution is introduced under stirring into diluted hydrochloric acid; the little quantities of resin thus resulting are separated (by reprecipitation from sodium carbonate solution by means of hydrochloric acid) and the remaining mixture is reduced according to Béchamp. By recrystallisation from water and alcohol the 4-aminobenzene-N-(β-propylcinnamoyl)-sulfonamide of the melting point of 160°–162° C. is obtained.

According to the same process the analogous compounds may be prepared with the following acyl radicals:

Table A

| No. | acyl radical | M. P. |
| --- | --- | --- |
| 1 | ⟨phenyl⟩-C(CH₃)=CH.CO— | 164°–165° C. |
| 2 | ⟨phenyl⟩-CH=C(CH₃).CO— | 156°–158° C. |
| 3 | ⟨phenyl⟩-C(CH₃)=C(CH₃).CO— | not crystallisable. |
| 4 | ⟨phenyl⟩-C(CH₃)=C(C₂H₅).CO— | 130° C. |

Beside the acid mentioned in the Example 3 and in Table A the following carboxylic acids may also be used: β-ethylcinnamic acid, α-ethylcinnamic acid, α-propylcinnamic acid, α-methyl-β-ethylcinnamic acid, α:β-diethylcinnamic acid, etc.

Example 4

20.2 parts of p-nitrobenzene sulfonamide in 200 parts of chlorobenzene are heated to boiling for 5 hours under stirring with 21 parts of p-methoxy-β-methylcinnamoyl chloride and 1 part of copper powder. Then the solvent is removed by means of steam, the residue dissolved in a sodium carbonate solution, filtered and the nitro derivative freed by means of acid. By reduction of the nitro body according to Béchamp the 4-aminobenzene-N-(p-methoxy-β-methylcinnamoyl)-sulfamide is obtained which, when recrystallised from water and alcohol, possesses the melting point of 182°–184° C.

Example 5

42.9 parts of p-chloro-β-methylcinnamoyl chloride are dissolved in 200 parts of chlorobenzene or of another organic solvent and heated under reflux for 6 hours with 2 parts of copper powder and 42.8 parts of p-acetylaminobenzene sulfonamide. The chlorobenzene is blown off by means of steam, the residue dissolved in a sodium carbonate solution, filtered and the acetyl derivative is precipitated with mineral acid. Then the raw product is saponified with 2n caustic soda lye and the pure 4-aminobenzene-N-(p-chloro-β-methylcinnamoyl)-sulfonamide having the melting point of 192°–194° C. is obtained therefrom by recrystallisation from alcohol and water.

The following table contains further combinations of analogous compounds with different acyl radicals.

Table B

| No. | acyl radical | M. P. |
| --- | --- | --- |
| 1 | CH₃-⟨phenyl⟩-C(CH₃)=CH.CO— | °C. 180-181 |
| 2 | CH₃-⟨phenyl-CH₃⟩-C(CH₃)=CH.CO— | 194–195 |
| 3 | CH₃-⟨phenyl⟩-C(phenyl)=CH.CO— | 196–197 |

Beside the compounds cited in the Examples 4 and 5 and in Table B the following acids are also suitable for the formation of substances with analogous properties: 4-chloro-α-methylcinnamic acid, 3:4-dichloro-β-methylcinnamic acid, 4-methoxy-β-ethylcinnamic acid, 3:4-dimethoxy-β-methylcinnamic acid, 3·4-methylenedioxy-β-methylcinnamic acid, 4-chloro-α:β-dimethylcinnamic acid, 4-phenoxy-β-methylcinnamic acid and the like, 4-methyl-β-phenylcinnamic acid, 4-chloro-β-phenylcinnamic acid, 3:4-dimethoxy-β-phenylcinnamic acid, 3:4-dimethyl-α-phenyl cinnamic acid, etc., 3:4-dimethyl-α-methylcinnamic acid, 4-methyl-β-ethylcinnamic acid, etc.

The cinnamic acid compounds mentioned above and known for the greatest part can be prepared according to the usual methods for the manufacture of cinnamic acid compounds.

In this application, only β-alkyl-cinnamoyl-sulfanilamides are claimed. The analogous α-alkyl- and α:β-dialkyl-cinnamoyl-sulfanilamides are claimed in our copending application, Ser. No. 752,558, filed June 4, 1947.

What we claim is:

1. A p-amino-benzene sulfonamide of the formula

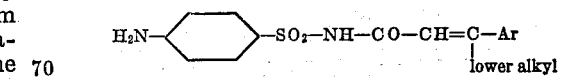

wherein Ar represents a member selected from the group consisting of phenyl, p-tolyl, p-methoxyphenyl, p-chlorophenyl and 3:4-dimethylphenyl radicals.

2. The p-aminobenzene sulfonamide of the formula
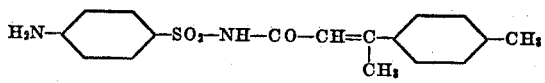
3. The p-aminobenzene sulfonamide of the formula
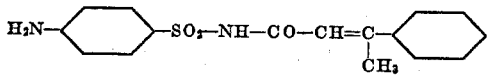
HENRY MARTIN.
HANS GYSIN.
OTTO NERACHER.
RUDOLF HIRT.
REFERENCES CITED
The following references are of record in the file of this patent:
FOREIGN PATENTS
| Number | Country | Date |
|---|---|---|
| 111,230 | Australia | Aug. 22, 1940 |
OTHER REFERENCES
Crossley et al., Jour. Am. Chem. Soc., vol. 61, Oct. 1939, pp. 2950–2955.